United States Patent
Guzman et al.

(10) Patent No.: US 6,826,883 B2
(45) Date of Patent: Dec. 7, 2004

(54) FLEXIBLE WINDOW MOLDING

(75) Inventors: Nelson Guzman, Leesburg, VA (US); John Kimball, Gapland, MD (US)

(73) Assignee: Rehau Incorporated, Leesburg, VA (US)

( * ) Notice: Subject to any disclaimer, the term of this patent is extended or adjusted under 35 U.S.C. 154(b) by 68 days.

(21) Appl. No.: 10/192,642

(22) Filed: Jul. 11, 2002

(65) Prior Publication Data

US 2003/0200717 A1 Oct. 30, 2003

Related U.S. Application Data

(60) Provisional application No. 60/375,009, filed on Apr. 25, 2002.

(51) Int. Cl.[7] .................................................. E04C 2/38
(52) U.S. Cl. ................. 52/716.5; 52/716.8; 52/717.03; 296/90; 296/93
(58) Field of Search ........................... 52/716.5, 716.7, 52/716.8, 717.03, 717.05, 204.597, 716.6; 296/90, 93, 84.1

(56) References Cited

U.S. PATENT DOCUMENTS

| 2,548,556 A | * | 4/1951 | Ogren .................... 52/204.597 |
| 2,625,715 A | | 1/1953 | Beck |
| 2,814,841 A | | 12/1957 | Brugler |
| 3,009,216 A | | 11/1961 | Kimber |
| 3,451,169 A | * | 6/1969 | Arnold et al. ................. 49/462 |
| 3,672,109 A | * | 6/1972 | Erck ...................... 52/204.597 |
| 4,880,674 A | * | 11/1989 | Shimizu ....................... 428/31 |
| 5,007,202 A | | 4/1991 | Guillon |
| 5,076,638 A | | 12/1991 | Andexlinger et al. |
| 5,688,016 A | * | 11/1997 | Gold ............................ 296/93 |
| 5,752,352 A | * | 5/1998 | Goto et al. .................... 52/208 |

FOREIGN PATENT DOCUMENTS

| EP | 0 251 765 | | 1/1988 |
| GB | 714 124 | | 8/1954 |
| GB | 2 286 416 | | 8/1995 |
| JP | 404085134 A | * | 3/1992 |

* cited by examiner

Primary Examiner—Naoko Slack
(74) Attorney, Agent, or Firm—McGuireWoods LLP

(57) ABSTRACT

Flexible molding for use in eliminating a gap between a windshield and an opening, or a pane and an opening, is accomplished by a unique hinge groove between an exterior surface member of the molding and a seat member. By pinching the two members together, the channel that receives and attaches to the windshield is widened, making it much easier to attach the molding to a windshield. Also, inside the channel are one or more barbs that ensure good retention of the molding to the windshield or pane. The barbs also provide better gripping for any adhesive used in the channel when securing the molding to a windshield. Also provided are primer ridges for improved adhesion of the molding to the car body or other structure.

7 Claims, 2 Drawing Sheets

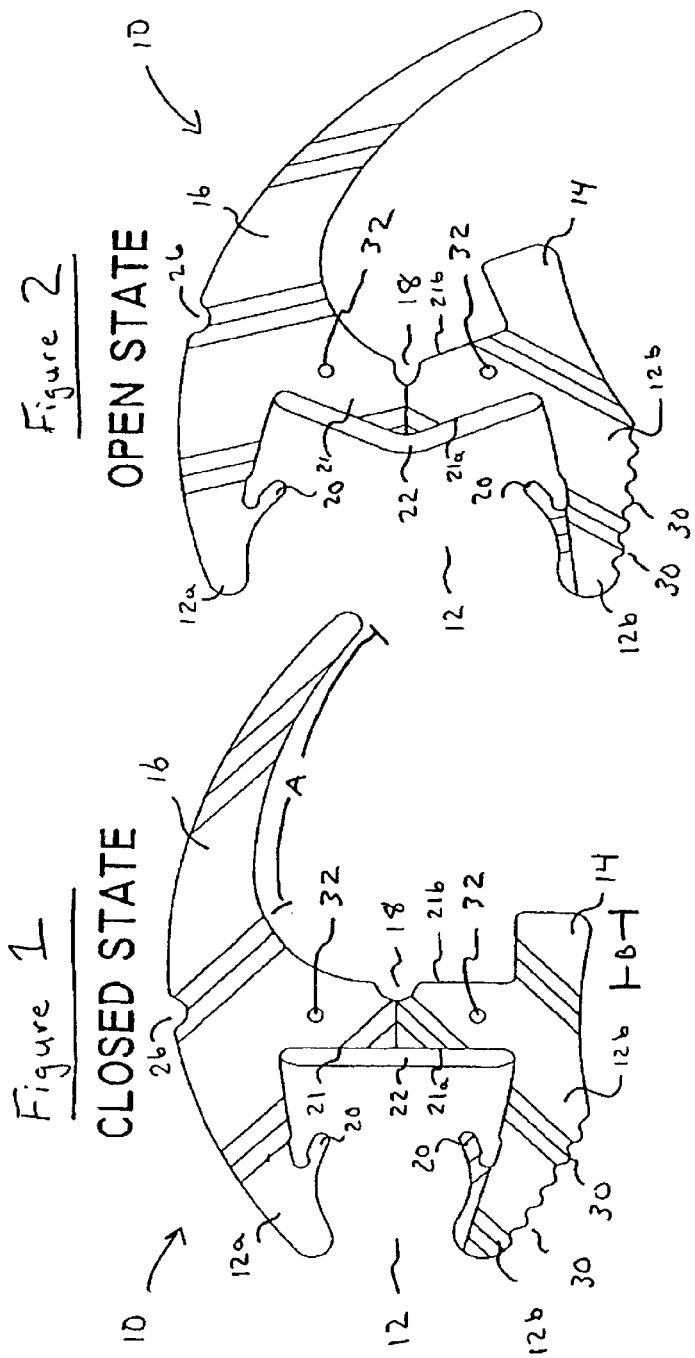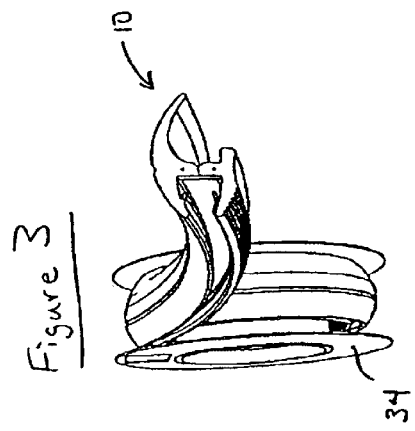

FLEXIBLE WINDOW MOLDING

CROSS-REFERENCE TO RELATED APPLICATION

This application is based on and claims priority to U.S. Provisional Application No. 60/375,009 entitled Seal Member For Glass Pane filed on Apr. 25, 2002, and herein incorporated by reference in its entirety.

FIELD OF THE INVENTION

The present invention is directed to a flexible molding used to surround the perimeter of a glass pane to be installed in an opening of a structure. Of particular applicability is a flexible molding that is used around the window or windshield for an automobile.

BACKGROUND OF THE INVENTION

The perimeter of a windshield is typically surrounded by flexible molding. The flexible molding eliminates the gap between the windshield and the body of the automobile. The flexible molding may, as a consequence, help to prevent wind and water from entering the interior cabin of the automobile. The windshield with the molding installed around the perimeter is placed in the windshield opening of the automobile. The molding is typically made from a flexible material and thereby compensates for variations in the windshield size relative to the automobile opening.

One difficult aspect to installing or replacing a windshield is the installation of the molding to the perimeter of the windshield. The edge of the windshield must be seated in a channel of the molding for the windshield to be installed properly. Because the size of the channel is very close to the thickness of the windshield, the installation of the molding around the windshield can be tedious and time consuming.

SUMMARY OF THE INVENTION

The present invention provides a flexible molding for a glass pane that is easily installed around the perimeter of the glass pane or windshield. In one embodiment, molding is provided with a channel opening tab. By applying a pinching force on the tab and the molding, the channel in the molding is easily widened, making the seating of the edge of the windshield in the channel quicker and easier without much resistance. The pinching force may be applied with the thumb and fore finger or by using a tool such as pliers or the like.

In one embodiment, the molding also provides for a set of barbs within the molding channel that aid in gripping the windshield and facilitates the binding of any adhesive applied in the channel to secure the molding.

Accordingly, one embodiment of the present invention is directed to a flexible molding for a pane to be seated in a opening, comprising an exterior surface member, an interior seating member spaced from and opposing the exterior surface member, a channel formed between the exterior surface member and the interior seating member, and a channel opening tab projecting from and substantially aligned with the interior seating member in a direction opposite the channel portion.

The flexible molding may include a first retention barb protruding into the channel portion from the exterior surface member and a second retention barb protruding into said channel portion from said interior seating member.

The exterior surface member may include an exterior surface lip extending therefrom in a direction opposite the channel portion and in a same direction as the channel opening tab.

The flexible molding may include a bridging member between the interior seating member and the exterior surface member, and a hinge groove formed on the bridging member and located behind the channel portion, where the hinge groove acts as a hinge when the channel opening tab and the surface lip are squeezed together causing the channel portion to widen.

The flexible molding may include at least one primer ridge located on the interior seating member for providing additional surface area for an adhesive. The flexible molding may include a plurality of primer ridges.

In another embodiment, the present invention includes a flexible molding for a window comprising an exterior surface member, a seating member spaced a distance from and opposing the exterior surface member, a channel portion formed between the exterior surface member and the seating member, and at least one retention barb projecting in the channel portion from either of the exterior surface member or the seating member.

A channel opening tab projecting from said seating member in a direction opposite said channel portion, and the exterior surface member comprising a surface lip extending in a direction opposite the channel portion and substantially in a same direction as said channel opening tab may be included.

The flexible molding may include a hinge groove located behind the channel portion, where the hinge groove acts as a hinge when the channel opening tab and the surface lip are squeezed together causing said channel portion to widen.

Further, the present invention includes a flexible molding for a window comprising an exterior surface member, a seating member spaced a distance from and opposing the exterior surface member, a channel portion formed between the exterior surface member and the seating member for receiving an edge of a window, and a hinge groove located behind the channel portion.

The flexible molding may include a surface lip in a direction opposite the channel portion and substantially in the same direction as the channel opening tab, where the surface lip is an extension of the exterior surface creating a curved continuous surface. The flexible molding may include at least one cord embedded in said molding.

Still further, the present invention includes a flexible molding for a window comprising an exterior surface member a seating member spaced a distance from and opposing said exterior surface member, a channel formed between the exterior surface member and the seating member, at least one retention barb projecting in said channel portion from one of said exterior surface member and said seating member, a channel opening tab projecting from said seating member in a direction opposite said channel portion, a primer ridge located on said seating member opposite said channel, and a hinge groove located behind said channel portion and said hinge groove acting as a hinge when said channel opening tab and said surface lip are squeezed together causing said channel portion to widen permitting insertion of the window.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a cross-sectional view of the flexible molding of the present invention in a closed state;

FIG. 2 is a cross-sectional view of the flexible molding of the present invention in an open state; and FIG. 3 shows a perspective view of extruded flexible molding of the present invention on a packaging spool;

DETAILED DESCRIPTION OF THE PREFERRED EMBODIMENTS

Figure 4:
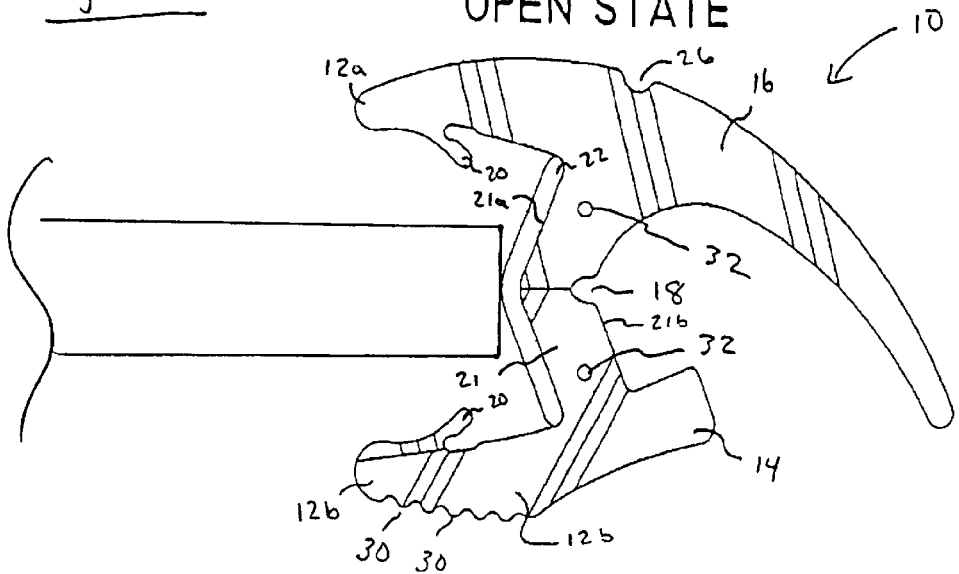
FIG. 4 shows a cross-sectional view of the flexible molding in an open state with a pane of glass therebetween.

The present invention is directed to a flexible molding used to eliminate a gap between a pane and an opening of a structure. More particularly, the present invention may be used to eliminate a gap between a glass windshield or window and the frame opening in an automobile or other types of vehicles or structures. While the invention has broad utility and may be adapted to a variety of applications, the invention will be discussed with respect to the installation of a windshield in an automobile. Those of ordinary skilled in the art will readily understand from the discussion provided herein, however, that the present invention is susceptible to broad utility and application. That is, many embodiments and adaptations of the present invention other than those herein described, as well as many variations, modifications and equivalent arrangement, will be apparent from or reasonably suggested by the present invention and the foregoing description without departing from the substance or scope of the present invention.

Flexible Molding of the Present Invention

Referring now to FIG. 1, a flexible molding of the present invention generally depicted as reference numeral 10 is shown. The flexible molding 10 is preferably made from an ultraviolet stable, weatherable elastomeric material that has good cold flexibility and compression set. Preferably, the material is also squeak resistant. Suitable materials for the molding are not particularly limited and are known to those skilled in the art which include, but are not limited to, PVC type polymers and materials having the trade names Rimtech™, Rau Pren 707, Santiprene™, and Alcryn® (E.I. Du Pont de Nemours and Company). Preferably, the flexible molding is made of unitary construction; though, different materials having different properties may be used in different portions of the flexible molding depending on the desired features of the flexible molding 10 (as discussed below). The flexible molding 10 may also be continuously extruded using techniques known to those skilled in the art.

The flexible molding member includes a channel 12 formed by opposing, extending members 12a, 12b. The extending member 12a is defined for purposes of clarity as an exterior surface member and the member 12b is an interior seating member. The channel 12 further includes a bridge section 21 having a wall 21a extending between the opposing exterior surface member 12a and the interior seating member 12b. The interior seating member 12b is designed to rest against an interior surface of the automobile windshield opening, and is typically secured to the automobile by using an adhesive such as a urethane adhesive. In embodiments, the interior seating member 12b may include one or more ridges 30 in order to increase a surface area thereof for the adhesive to promote a more secure installation of the windshield.

An adhesive 22 may be placed in the channel 12 and, more preferably, on the wall 21 to adhere the windshield to the flexible molding 10. Any adhesive that promotes a bond between the edge of the windshield and the molding may be used with the present invention such as, for example, butyl adhesives.

A channel opening tab 14 and an exterior surface lip 16 are formed on the opposing side of the channel 12. The exterior surface lip 16 extends from the exterior surface member 12a and is substantially aligned therewith. Similarly, the channel opening tab 14 extends from the interior seating member 12b and is substantially aligned therewith. The exterior surface lip 16 is provided to accommodate differences in the size of the windshield and the opening of the automobile. The exterior surface lip 16 may be made from flexible squeak resistant material while the material used for making the channel opening tab 14 may be more rigid. The bridging section 21 extends between the channel opening tab 14 and the exterior surface lip 16.

In embodiments, the channel opening tab 14 is a first length "B" and the exterior surface lip 16 is a second length "A." In further embodiments, the first length "B" is larger than the second length "A;" however, it should be well understood that the lengths "A" and "B" may be substantially the same lengths or other variation of lengths. In still further embodiments, the exterior surface lip 16 may have a curvature curving downwards towards the channel opening tab 14. In a preferred embodiment, the exterior surface is a curved surface (FIGS. 1 and 2); however, the curvature of the exterior surface can take on a variety of configurations and may even be flat. In still further embodiments, an exterior surface of the exterior surface member 12a and exterior surface lip 16 may create a continuous exterior curved surface.

In one embodiment, a hinge 18 is located between the channel opening tab 14 and the exterior surface lip 16, preferably on a distal wall section 21b of the bridging section 21 (opposing side of the channel 12). The hinge 18 may be a groove or other similar mechanism and is provided to assist in the opening of the channel 12 or to allow the channel to open wider. (See, FIG. 2.) By way of example, when the channel opening tab 14 and exterior surface lip 16 are squeezed or pinched, the channel 12 is able to open easier due to the removal of some of the material behind the channel 12, which acts as a hinge.

One or more retention barbs 20 may extend inwardly towards the channel 12. The retention barbs 20 may be used to promote good retention of the windshield in the channel 12 when the molding 10 is in a closed state. In embodiments, the retention barbs 20 are provided at the proximal ends of the opposing members 12a, 12b, but may also be positioned at other locations.

Still referring to FIG. 1, resilient cords 32 may be embedded in the wall section 21; however, it should be understood by those of ordinary skill in the art that the cords 32 may be embedded in other locations such as, for example, the members 12a, 12b as well as the exterior surface lip 16 and/or the channel opening tab 14. In one embodiment, the cords are nylon cords embedded in the flexible molding 10 to reduce stretch and snap back during installation. If desired, one or more grooves decorative 26 may be provided in the exterior surface 24. In the embodiment shown, the groove 26 is positioned between the member 12a and the exterior surface lip 16.

The flexible molding 10 of the present invention may be manufactured in varying and different sizes and dimensions depending on the application. For example, the molding may be manufactured with differing channel widths to accommodate windshields that have different thickness'. The flexible molding may also be continuously extruded using techniques known to those skilled in the art. However the adhesive 22 is typically applied in the channel in a second step after extrusion of the flexible molding.

The flexible molding 10 may be also provided in fixed lengths for specific applications or as shown in FIG. 3. Specifically, FIG. 3 shows the flexible molding 10 packaged on a spool to provide the end user the flexibility on the length of the flexible molding required for a given application. The flexible molding 10 may be manufactured in varying sizes depending on the application without departing from the scope of the invention.

Method of Using the Flexible Molding of the Present Invention

The flexible molding has a channel 12 adapted to receive the edge of a windshield. FIGS. 1 and 2 are cross-sections of one embodiment of the flexible molding 10 in a closed state and in an open state, respectively. To position the flexible channel in the open state (FIG. 2), the channel 12 is widened by applying a pinching force on the channel opening tab 14 and exterior surface lip 16. The exterior surface lip 16 is provided to accommodate for differences in the size of the windshield and the opening of the automobile. Since the flexible molding 10 is typically made of flexible materials, applying a pinching force using the channel opening tab 14 and the exterior surface lip 16 will cause the channel 12 to open or widen making it easier to seat the edge of the windshield in the channel 12. When the pinching is applied, the groove or hinge 18 will collapse and assist in the opening of the channel 12.

Figure 5:
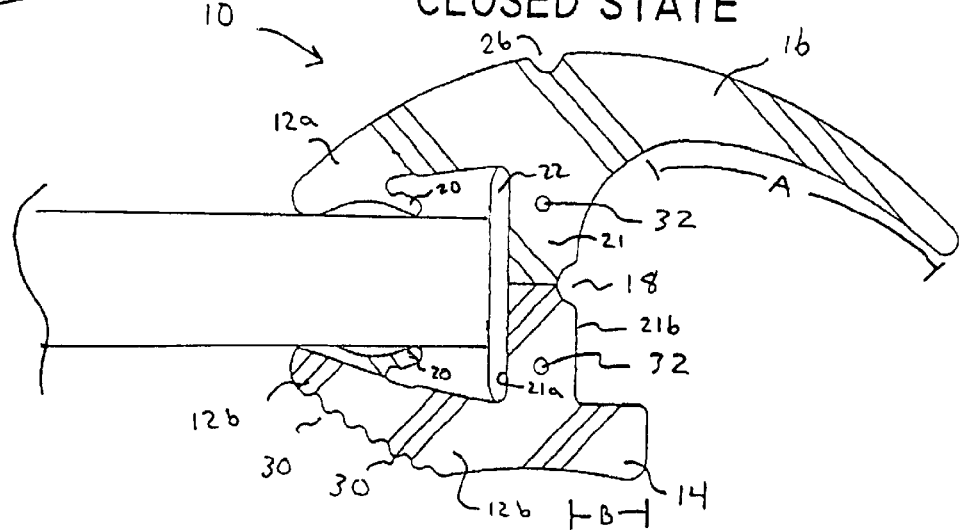
FIG. 5 shows a cross-sectional view of the flexible molding in a closed state with a pane of glass therebetween.

Once in the open state, the flexible molding 10 can then easily receive the edge of the windshield (FIG. 4). This is because the opening of the channel 12 is now wider than the thickness of the windshield or other glass. At this time, the windshield is inserted into the channel and the adhesive 22 provides a bonding between the flexible molding 10 and the windshield. As the windshield is placed within the channel, the retention barbs 20 may be pushed inwards (depending on the opening width of the channel), against the windshield, itself. When the pinching force is released from the exterior surface lip 16 and the channel opening tab 14, the one or more retention barbs 20 will flex towards the windshield, thereby ensuring good retention of the windshield in the channel 12 of the flexible molding 10 (FIG. 5). It is noted that in embodiments of the present invention, any combination of the groove and channel opening tab 14 may provide the benefits of the present invention. An additional benefit of the present invention, aside from the ease of opening, is the retention barbs which ensure that the windshield remains in a stationary position.

The one or more primer ridges 30 may provide additional surface area for the adhesive to promote a more secure installation of the windshield. The nylon cords 32 may be embedded in the flexible molding 10 to reduce stretch and snap back during installation. Preferably, the flexible molding is made of unitary construction.

Accordingly, while the present invention has been described in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise exclude any other embodiments, adaptations, variations, modifications or equivalent arrangements, the present invention being limited only by the claims and the equivalents thereof.

What is claimed is:

1. A flexible molding for a pane to be seated in a opening, comprising:
   an exterior surface member;
   an interior seating member spaced from and opposing said exterior surface member;
   a channel portion formed between said exterior surface member and said interior seating member;
   a channel opening tab projecting from and substantially aligned with said interior seating member in a direction opposite said channel portion;
   a bridging member between said interior seating member and said exterior surface member; and
   a hinge groove formed on said bridging member and located behind said channel portion,
   wherein said hinge groove acts as a hinge when said channel opening tab and an exterior surface lip are squeezed together causing said channel portion to widen.

2. The flexible molding as recited in claim 1, further comprising:
   a first retention barb protruding into said channel portion from said exterior surface member; and
   a second retention barb protruding into said channel portion from said interior seating member.

3. The flexible molding as recited in claim 1, wherein said exterior surface member comprises said exterior surface lip extending therefrom in an direction opposite said channel portion and in a same direction as said channel opening tab.

4. The flexible molding as recited in claim 1, further comprising gat least one primer ridge located on said interior seating member for providing additional surface area for an adhesive.

5. The flexible molding as recited in claim 4, wherein said at least one primer ridge comprises a plurality of primer ridges.

6. A flexible molding for a window comprising:
   an exterior surface member;
   a seating member spaced a distance from and opposing said exterior surface member;
   a channel portion formed between the exterior surface member and the seating member;
   at least one retention barb projecting in said channel portion from one of said exterior surface member and said seating member;
   a channel opening tab projecting from said seating member in a direction opposite said channel portion;
   a primer ridge located on said seating member opposite said channel; and
   a hinge groove located behind said channel portion and said hinge groove acting as a hinge when said channel opening tab and an exterior surface lip are squeezed together causing said channel portion to widen permitting insertion of the window.

7. The flexible molding of claim 6 further comprising at least one cord embedded in said molding.

* * * * *